United States Patent
Isaac

(10) Patent No.: US 12,071,139 B2
(45) Date of Patent: Aug. 27, 2024

(54) DRIVER PASSENGER DETECTION USING ULTRASONIC SENSING

(71) Applicant: ALLSTATE INSURANCE COMPANY, Northbrook, IL (US)

(72) Inventor: Emad Isaac, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 306 days.

(21) Appl. No.: 17/360,550

(22) Filed: Jun. 28, 2021

(65) Prior Publication Data

US 2022/0410906 A1    Dec. 29, 2022

(51) Int. Cl.
| | |
|---|---|
| B60W 40/08 | (2012.01) |
| G06F 18/21 | (2023.01) |
| G06F 18/24 | (2023.01) |
| G06N 20/20 | (2019.01) |
| G06V 20/59 | (2022.01) |
| H04W 4/40 | (2018.01) |
| H04W 4/70 | (2018.01) |

(52) U.S. Cl.
CPC .......... *B60W 40/08* (2013.01); *G06F 18/217* (2023.01); *G06F 18/24* (2023.01); *G06N 20/20* (2019.01); *G06V 20/59* (2022.01); *H04W 4/40* (2018.02); *H04W 4/70* (2018.02); *B60W 2040/0881* (2013.01); *B60W 2420/54* (2013.01); *B60W 2540/043* (2020.02)

(58) Field of Classification Search
CPC ......... B60W 40/08; B60W 2040/0881; B60W 2420/54; G06F 18/217; G06F 18/24; G06N 20/20; G06V 20/59; H04W 4/40; H04W 4/70

See application file for complete search history.

(56) References Cited

U.S. PATENT DOCUMENTS

| | | |
|---|---|---|
| 5,708,421 A | 1/1998 | Boyd |
| 6,304,179 B1 | 10/2001 | Lotito et al. |

(Continued)

FOREIGN PATENT DOCUMENTS

| | | |
|---|---|---|
| CN | 107757475 A | 3/2018 |
| ES | 2357267 A1 | 4/2011 |

(Continued)

OTHER PUBLICATIONS

Mar. 23, 2022—(US) Notice of Allowance—U.S. Appl. No. 17/360,361, 9 Pages.

(Continued)

*Primary Examiner* — Peter D Nolan
*Assistant Examiner* — Roy Rhee
(74) *Attorney, Agent, or Firm* — Akerman LLP

(57) ABSTRACT

Aspects of the disclosure relate to using ultrasonic or other types of signals to detect a driver in a vehicle. A computing platform may receive ultrasonic sensing data associated with mobile devices in the vehicle from a signal transmitter. Unique identifiers of the mobile devices may be determined. Based on the ultrasonic sensing data and the unique identifier, a relative distance from the signal transmitter to each mobile device in the vehicle may be determined. The computing platform may use a machine learning classifier to determine that a particular occupant is a driver in the vehicle based on the relative distance.

18 Claims, 4 Drawing Sheets

(56) References Cited

U.S. PATENT DOCUMENTS

| | | | |
|---|---|---|---|
| 6,492,906 | B1 | 12/2002 | Richards et al. |
| 7,015,824 | B2 | 3/2006 | Cleveland et al. |
| 8,159,338 | B2 | 4/2012 | Breed |
| 9,843,777 | B2 | 12/2017 | Schofield et al. |
| 9,963,145 | B2 | 5/2018 | Penilla et al. |
| 10,068,473 | B1 | 9/2018 | Harrison et al. |
| 10,139,827 | B2 | 11/2018 | Charette et al. |
| 10,493,911 | B2 | 12/2019 | Lopez-Hinojosa et al. |
| 10,598,782 | B2 | 3/2020 | Kim et al. |
| 10,685,248 | B1* | 6/2020 | Sanandaji ......... G06F 18/23213 |
| 11,194,329 | B2 | 12/2021 | Lehtiniemi et al. |
| 11,257,370 | B2 | 2/2022 | Aoude et al. |
| 2008/0036623 | A1* | 2/2008 | Rosen ................. H04M 3/2281 |
| | | | 340/936 |
| 2010/0039291 | A1 | 2/2010 | Harrison et al. |
| 2011/0183601 | A1 | 7/2011 | Hannon |
| 2017/0019525 | A1 | 1/2017 | Hannon et al. |
| 2018/0035326 | A1* | 2/2018 | Rajapakse ......... H04W 28/0215 |
| 2019/0025402 | A1* | 1/2019 | Qu .......................... G01S 11/14 |
| 2021/0338517 | A1 | 11/2021 | Taniguchi et al. |

FOREIGN PATENT DOCUMENTS

| | | |
|---|---|---|
| JP | 2015101332 A | 6/2015 |
| KR | 20160050285 A | 5/2016 |
| WO | 2019048332 A1 | 3/2019 |

OTHER PUBLICATIONS

"Concept Android Auto App Alerts You of Pedestrians Before You See Them", https://www.androidpolice.com/2020/01/10/concept-android-auto-app-alerts-you-of-pedestrians-before-you-see-them/, May 5, 2020, 4 pages.

Van Groeningen, et al., "An Ultrasonic Sensor for Human Presence Detection to Assist Rescue Work in Large Buildings", ISPRS Annals of the Photogrammetry, Remote Sensing and Spatial Information Sciences, vol. IV-4/W7, 2018, 3rd International Conference on Smart Data and Smart Cities, Oct. 4-5, 2018, Delft, The Netherlands, 7 pages.

Hardiyanto, "Pedestrian Crossing Safety System at Traffic Lights based on Decision Tree Algorithm" (IJACSA) International Journal of Advanced Computer Science and Applications, vol. 10, No. 8, 2019, 5 pages.

Branquinho, et al., "An Efficient and Secure Alert System for VANETs to Improve Crosswalks' Security in Smart Cities", www.mdpi.com/journal/sensors, Published: Apr. 27, 2020, pp. 1-26.

Wang, "WalkSafe: A Pedestrian Safety App for Mobile Phone Users Who Walk and Talk While Crossing Roads", https://www.semanticscholar.org/paper/WalkSafe%3A-a-pedestrian-safety-app-for-mobile-phone-Wang-Cardone/da129a9864a2b2338e6993b674b65f5bc733a9e1, 6 pages.

Wu, et al., "Cars Talk to Phones: A DSRC Based Vehicle-Pedestrian Safety System", https://ccv.eng.wayne.edu/reference/Cars%20Talk%20to%20Phones.pdf, 7 pages.

Indyk D et al.: "Survey of Range Vision Systems", Mechatronics, Pergamon Press, Oxford, GB, vol. 4, No. 4, Jun. 1, 1994 (Jun. 1, 1994), pp. 417-449, XP000450857, ISSN: 0957-4158, DOI: 10.1016/0957-4158(94)90021-3.

Invitation to Pay Additional Fees and, Where Applicable, Protest Fee for International application No. PCT/US2022/035245 dated Oct. 24, 2022 (12 pages).

* cited by examiner

DRIVER PASSENGER DETECTION USING ULTRASONIC SENSING

BACKGROUND

Aspects of the disclosure relate generally to the processing and management of big data. In particular, aspects of the disclosure relate to detecting driver role using sensing data.

When a group of people embark on a road trip, a vehicle may have multiple occupants and each occupant may carry one or more mobile devices. To track a driving pattern and provide insights into the trip, a server in a central office may attempt to communicate with a mobile device of a driver of the vehicle. However, conventional systems may not be able to readily identify which occupant is the driver of the vehicle, particularly when there are multiple mobile devices present simultaneously in a small confined space inside the vehicle.

Aspects described herein may address these and other problems, and generally improve the quality, efficiency, and performance of driver detection and offer insights into the occupants of the vehicle.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Aspects described herein are directed towards driver passenger detection using ultrasonic sensing techniques. In accordance with one or more embodiments, a computing device may receive ultrasonic sensing data associated with various mobile devices from a signal transmitter mounted inside or outside of a vehicle. The signal transmitter may include a high-frequency ultrasonic transmitter. The mobile devices may be associated with different occupants in the vehicle. The computing device may determine a unique identifier associated with each mobile device. Based on the ultrasonic sensing data and the unique identifier, a relative distance from the signal transmitter to each mobile device in the vehicle may be determined. Accordingly, the computing device may determine that a particular occupant is a driver of the vehicle by comparing the relative distances from the signal transmitter to each mobile device.

In one or more instances, the computing device may receive sensor data from a sensor array associated with the vehicle. The sensor array may include an infrared sensor, a sound sensor, a pressure sensor and a motion sensor. Based on the ultrasonic sensing data and the sensor data, the computing device may use a machine learning classifier to determine that the particular occupant is the driver of the vehicle. The machine learning classifier may include a supervised machine learning classifier and an unsupervised machine learning classifier.

In many aspects, the machine learning classifier may be trained using training data comprising predefined labels and the machine learning classifier may output predicted labels for occupants associated the vehicle. The sensor data and the ultrasonic sensing data may be subsequently provided as input to the trained machine learning classifier. The trained machine learning classifier may output a role label of the particular occupant indicating whether the particular occupant is a driver or a passenger of the vehicle.

In many aspects, the computing device may determine a first set of predicted labels with corresponding confidence scores falling below a threshold value. The machine learning classifier may regenerate a second set of predicted labels, and the second set of predicted labels may have confidence scores above the threshold value.

In many aspects, the computing device may receive the ultrasonic sensing data associated with a plurality of frequencies from the signal transmitter. Each frequency may correspond to a mobile device in the vehicle. Alternatively, each frequency may correspond to a communication channel between the signal transmitter and the corresponding mobile device. The computing device may store a frequency signature associated with a particular mobile device in a sensing database system. The frequency signature may indicate a mapping between an identifier of the particular mobile device and a particular frequency that the signal transmitter used to communicate with the particular mobile device.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As a general introduction, aspects described herein are directed towards asset risk profiling for managing enterprise resources, which may provide a holistic view of the enterprise systems from the perspectives of security protection, privacy protection, operation risk protection, confidential protection and integrity protection.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect connecting, coupling, and the like. Computer software, hardware, and networks may be utilized in a variety of different system environments, including standalone, networked, remote-access (also known as remote desktop), virtualized, and/or cloud-based environments, among others.

Figure 1:
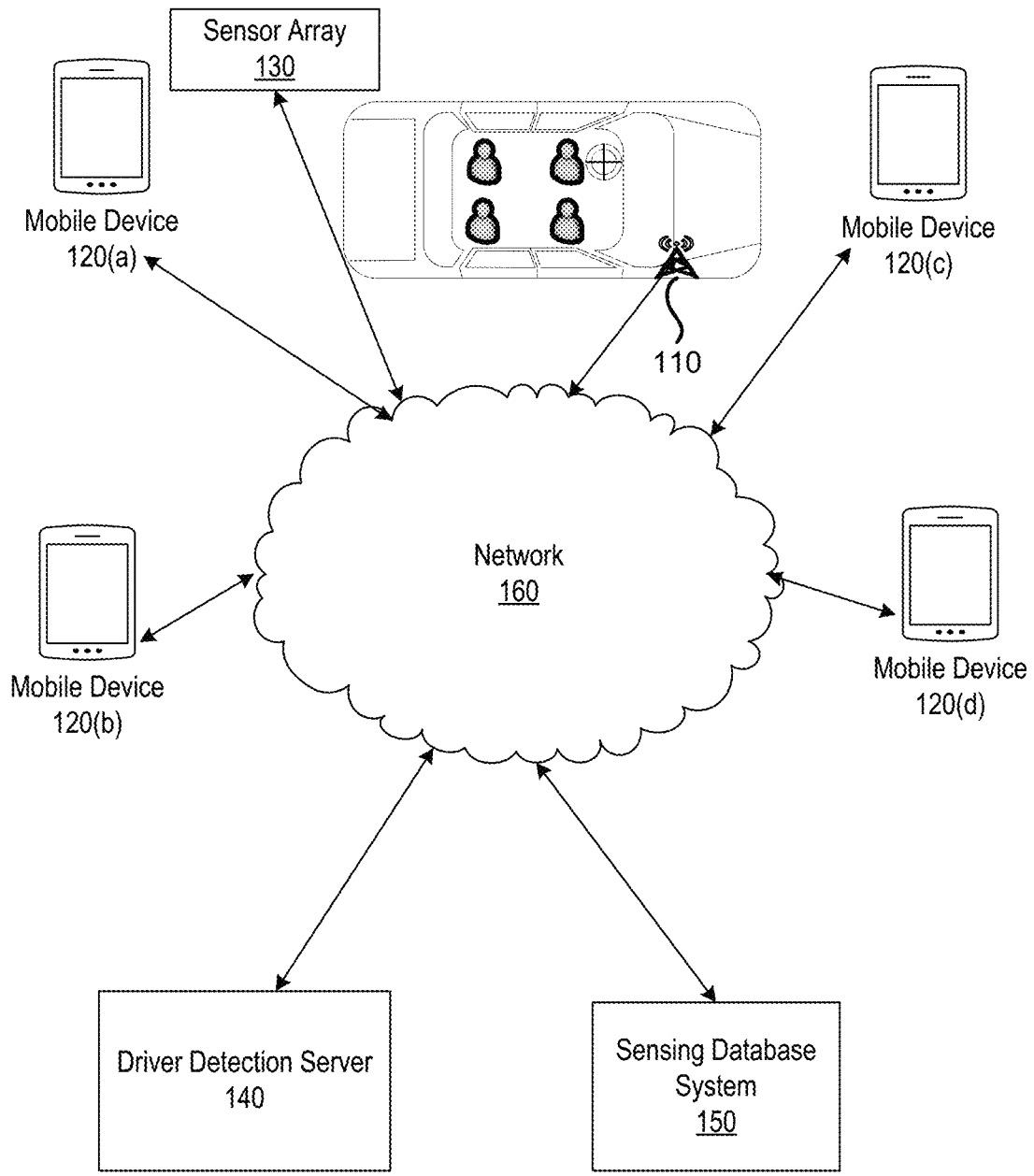
FIG. 1 shows an example of a system in which one or more aspects described herein may be implemented.

FIG. 1 depicts an illustrative system for driver passenger detection using ultrasonic sensing in accordance with one or more example embodiments. Referring to FIG. 1, computing environment 100 may include one or more computer systems. For example, computing environment 100 may include one or more signal transmitters 110, one or more mobile devices 120, one or more sensor arrays 130, a driver detection server 140, and a sensing database system 150 in communication via network 160. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. Any of the devices and systems described herein may be implemented, in whole or in part, using one or more computing devices described with respect to FIG. 2.

Signal transmitter 110 may be adapted to be placed inside or outside a vehicle. For example, signal transmitter 110 may be mounted on a mirror of the vehicle. Signal transmitter 110 may emit an ultrasonic signal with a specific frequency, which may be detected by a device such as a mobile device of an occupant in the vehicle. Signal transmitter 110 may emit high-frequency waves (e.g. short wavelength) ultrasonic signals. Increasing the number of waves of compression and rarefaction for a given distance may more accurately discriminate between two separate structures along the axial plane of wave propagation. For example, signal transmitter 110 may use ultrasonic signals with a frequency above 10 megahertz (MHz). Signal transmitter 110 may use a specific frequency that may serve as a frequency signature for the specific signal transmitter. Signal transmitter 100 may use a specific communication channel to communicate with a specific mobile device.

Signal transmitter 110 may broadcast ultrasonic signals to a group of mobile devices within a predefined radius such as inside the vehicle. Using ultrasonic sensing and transmitting, system 100 may transmit unique code to the mobile devices to uniquely identify a specific mobile device from other mobile devices in the vehicle. Signal transmitter 110 may communicate with the specific mobile devices using unique codes and/or a specific frequency. System 100 may identify a mobile device based on the unique code and measure a relative distance from the signal transmitter 110 to the corresponding mobile device. Signal transmitter 110 may send the measurement of the relative distance to a server in system 100, such as driver detection server 140.

Mobile device 120 may be any device that belongs to an occupant of the vehicle. The occupant may not need to pre-configure mobile device 120 to use driver detection system 100 or to pair mobile device 120 with a Bluetooth device in the vehicle. Mobile device 120 may receive the ultrasonic signal from signal transmitter 110 via an ultrasonic sensor on mobile device 120. Mobile device 120 may receive other signals, for example, an infrared signal, or a sound signal. Mobile device 120 may also include an infrared sensor, a sound sensor, a pressure sensor or a motion sensor. Mobile device 120 may receive a probing signal from signal transmitter 110 and send a response with the unique code or identifier that identifies mobile device 120.

Each mobile device 120 may communicate with signal transmitter 110 using a specific frequency and/or via a specific communication channel. Such specific frequency may be modulated to serve as a frequency signature of the mobile device and the corresponding occupant.

Mobile devices 120 may include computing devices, such as, smart phones, tablets, and the like. According to some examples, mobile devices 120 may include hardware and software that allow them to connect directly to network 160. Alternatively, mobile devices 120 may connect to a local device, such as gateway device, a server, or other computing device, which connects to network 160.

Sensor array 130 may include an infrared sensor, a sound sensor, a pressure sensor and/or a motion sensor. Sensory array 130 may be placed inside or outside the vehicle. An infrared sensor may be an electronic instrument that is used to sense certain characteristics of its surroundings. The infrared sensor may either emit or detect infrared radiation. The infrared sensor may also be capable of measuring the heat being emitted by an object and detecting motion. For example, the infrared sensor may be used as an obstacle detector via transmission of an infrared signal, and this infrared signal may bounce from the surface of an object and the signal may be received at the infrared receiver. As such, the infrared sensor may detect a presence and location of an object, such as an occupant and the mobile device in the vehicle.

In a variety of embodiments, a sound sensor may detect a sound intensity of the environment, which may include a microphone. A pressure sensor may be a device or instrument which is able to measure the pressure in gases or liquids. A pressure sensor may include a pressure-sensitive element which may determine the pressure being applied and components to convert the information into an output signal. For example, the pressure sensor may convert pressure into an analogue electrical signal and the pressure may be measured electronically using pressure transducers and pressure switches. A motion sensor may be an electrical device that utilizes a sensor to detect nearby motion. The motion sensor may emit light (e.g., a laser beam), and then if an object blocks the light, the sensor may be triggered. For example, passive motion sensors may pick up infrared signals put off by body heat. If the passive motion sensor notices an infrared energy, the motion detector may be triggered. The motion detector may detect motion through the principle of Doppler radar, where a continuous wave of microwave radiation may be emitted, and phase shifts in the reflected microwaves due to motion of an object toward or away from the receiver result in a heterodyne signal at a low audio frequency. The motion sensor may use other types of signals, such as ultrasonic signal, or use video camera software or gesture sensor to detect the motion of the occupants. Various sensors in sensor array 130 may generate sensor data and may be combined to verify or complement the determination of the presence and locations of the occupants in the vehicle.

Driver detection server 140 may receive ultrasonic sensing data associated with mobile devices in the vehicle from signal transmitter 110. Driver detection server 140 may determine a unique identifier or a unique code associated with each mobile device, such as a phone number of the mobile device, or an IP address or a MAC address associated with the mobile device. Based on the ultrasonic sensing data and the unique identifier, driver detection server 140 may determine a relative distance from the signal transmitter to each mobile device in the vehicle. Driver detection server 140 may determine whether a particular occupant is a driver in the vehicle by comparing the relative distances from the signal transmitter to each mobile device. Alternatively, driver detection server 140 may use a machine learning classifier to determine whether a role of the occupant is the driver of the vehicle based on the relative distances.

In a variety of embodiments, driver detection server 140 may receive sensor data from sensor array 130. Driver detection server 140 may use a machine learning classifier to determine the role for the particular occupant based on the ultrasonic sensing data and the sensor data. The sensor data may also be used to verify or complement the determination of the presence and locations of the occupants in the vehicle, and the role of the particular occupant.

In a variety of embodiments, driver detection server 140 may receive ultrasonic sensing data associated with a plurality of frequencies, where each frequency may correspond to one mobile device in the vehicle. Each frequency may also correspond to a communication channel between the signal transmitter and the corresponding mobile device. Such frequency may serve as a signature of the mobile device. Driver detection server 140 may storing a frequency signature associated with a particular mobile device in sensing database system 150.

Sensing database system 150 may store data record related to a frequency signature for a mobile device. The data record may include a mapping between an identifier of the particular mobile device and a particular frequency that the signal transmitter used to communicate with the particular mobile device. Sensing database system 150 may store ultrasonic sensing data collected by signal transmitter 110. Sensing database system 150 may also store sensor data collected by sensor array 130. Sensing database system 150 may receive a request from driver detection server 140 to store, update or retrieve a record related to frequency signature, ultrasonic sensing data or sensor data.

Signal transmitters 110, mobile devices 120, sensor arrays 130, driver detection server 140, and sensing database system 150 may be associated with a particular authentication session. Driver detection server 140 may receive, process, and/or store a variety of frequency signatures, identifiers or unique codes, ultrasonic sensing data, sensor data and/or mapping information with sensing database system 150 as described herein. However, it should be noted that any device in system 100 may perform any of the processes and/or store any data as described herein. Some or all of the data described herein may be stored using one or more databases. Databases may include, but are not limited to relational databases, hierarchical databases, distributed databases, in-memory databases, flat file databases, XML, databases, NoSQL databases, graph databases, and/or a combination thereof. The network 160 may include a local area network (LAN), a wide area network (WAN), a wireless telecommunications network, and/or any other communication network or combination thereof.

The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. A file-based integration scheme or a service-based integration scheme may be utilized for transmitting data between the various computing devices. Data may be transmitted using various network communication protocols. Secure data transmission protocols and/or encryption may be used in file transfers to protect the integrity of the data such as, but not limited to, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the data sharing system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. Secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
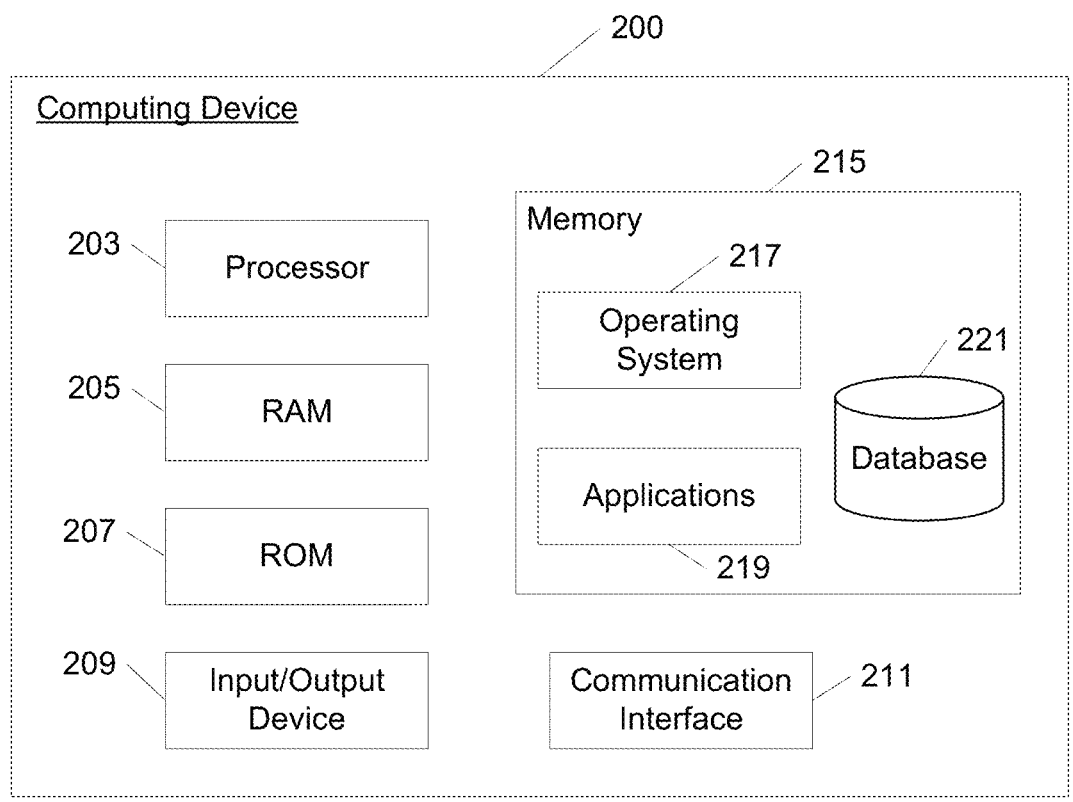
FIG. 2 shows an example of a computing device in accordance with one or more aspects described herein.

Turning now to FIG. 2, a computing device 200 that may be used with one or more of the computational systems is described. The computing device 200 may include a processor 203 for controlling overall operation of the computing device 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device configured to perform the processes and functions described herein.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. Memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Communication interface 211 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches including, but not limited to, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Driver detection system 100 may use ultrasonic signals to determine a relative distance from a signal transmitter to a mobile device that an occupant carries in a vehicle. Based on the relative distances and other types of sensor data, a machine learning classifier may be used to offer insights into the roles of the occupants.

Figure 3:
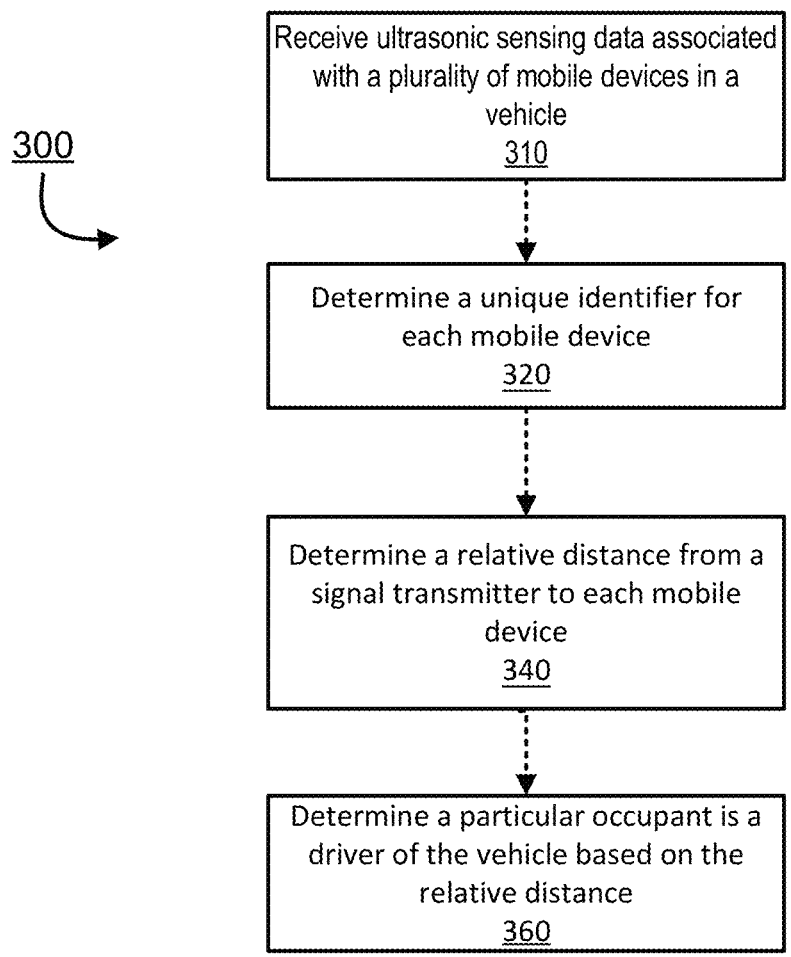
FIG. 3 depicts an illustrative method for driver passenger detection using ultrasonic sensing in accordance with one or more aspects of the disclosure.

FIG. 3 depicts an illustrative method for driver passenger detection in accordance with one or more aspects of the disclosure. Some or all of the steps of process 300 may be performed using one or more computing devices as described herein. In a variety of embodiments, some or all of the steps described below may be combined and/or divided into sub-steps as appropriate.

At step 310, a computing device such as a driver detection server may receive ultrasonic sensing data associated with a plurality of mobile devices in a vehicle. The ultrasonic sensing data may be transmitted by a signal transmitter that may emit an ultrasonic signal. The signal transmitter may be adapted to be placed inside the vehicle or mounted outside the vehicle, such as on a mirror. The signal transmitter may emit high-frequency ultrasonic signals that may be more accurate than using other technologies such as radio frequency, cellular, WiFi or Bluetooth signals to determine a relative distance to an object, particularly when there are multiple mobile devices present inside the vehicle.

There may be multiple occupants in the vehicle, and the signal transmitter may send the ultrasonic signal to a mobile device carried by each occupant. In an embodiment, the mobile device may be a mobile phone. The mobile device may receive the ultrasonic signal from a signal transmitter. The mobile device may detect the ultrasonic signal through an application running in a background of the mobile phone or through the operating system of the mobile phone. The mobile phone may include a sensor to receive the ultrasonic signal. For example, a group of four people may embark on a trip together in a rental car. Each occupant may carry at least one mobile device. Given that the mobile devices may not be readily paired with the rental car via Bluetooth, the computing device may not be aware which mobile device belongs to a driver of the vehicle.

In a variety of embodiments, the computing device may receive sensor data from a sensor array that may include a variety of sensors, such as an infrared sensor, a sound sensor, a pressure sensor and a motion sensor. Sensor data collected from the sensor array may be used to verify or complement the ultrasonic sensing data. For example, if there are four people in the rental car, but the signal transmitter detects there are five mobile devices present in the vehicle. The computing device may use the pressure sensors mounted in the seats to determine there are actually four occupants. An occupant may carry more than one mobile device.

At step 320, the computing device may determine a unique identifier associated with each mobile device. The signal transmitter may send a probe via, for example, the ultrasonic signal to the mobile device and the mobile device may respond with a unique code or identifier associated with the mobile device, such as a phone number of the mobile device, or an IP address or a MAC address associated with the mobile device. The computing device may also use the infrared sensor to send the probing signal to the mobile device. The computing device may use both the ultrasonic and the infrared signals as probing signals. For example, the signal transmitter or an infrared sensor may send a probing signal to each of the five mobile devices in the rental car and receive five unique codes or identifiers respectively.

In a variety of embodiments, the signal transmitter may use a unique sequency to communicate with each mobile device. For example, the signal transmitter may use frequency F1 to communicate with the first mobile device, and receive a unique identifier ID1. The signal transmitter may use frequency F2 to communicate with the second mobile device, and receive a unique identifier ID2. The signal transmitter may use frequency F3 to communicate with the third mobile device, and receive a unique identifier ID3, and so forth. The computing device may store the signature frequency F1 with the corresponding identifier ID1 in a sensing database system. Likewise, frequency signatures F2-F5 may also be stored with ID2-5 respectively in the sensing database system.

At step 330, based on the ultrasonic sensing data and the unique identifier, the computing device may determine a relative distance from the signal transmitter to each mobile device in the vehicle. The signal transmitter may determine a relative distance from the mobile device to the signal transmitter mounted, for example, on the mirror. The signal transmitter may measure the distance using the ultrasonic signal that is transmitted to the mobile device and bounced back to the signal transmitter. The signal transmitter may measure the distance using other types of signals such as infrared, sound or light signals. These other types of signals may also be used to verify the measurement from the ultrasonic signal. The signal transmitter may send information related to the relative distances to the computing device (e.g. the driver detection server.)

At step 340, the computing device may determine that a particular occupant is a driver of the vehicle based on the relative distances. In a variety of embodiments, the computing device may determine the driver based on a comparison of the relative distances. For example, if the signal transmitter is mounted on the driver side mirror, and the computing device received five relative distances D1-D5 corresponding to mobile devices ID1-ID5, respectively. The computing device may determine that the relative distances have the relationships: D1<D2<D3=D4<D5. The computing device may determine that mobile device ID1 with relative distance D1 may be carried by the driver of the vehicle due to its proximity to the signal transmitter. ID2-ID5 may be carried by passengers of the vehicle, and a passenger may carry two mobile devices ID3 and ID4.

In a variety of embodiments, the computing device may use a machine learning classifier to determine the driver of the vehicle based on the relative distances. The machine learning classifier may be more sophisticated in predicting occupant labels or roles (e.g. a driver or a passenger). For example, in the compact sized car, the differences in relative distances for the positions of the mobile devices may have small variations; while in a van or a bus, the differences in relative distances for the positions of the mobile devices may have more substantive variations. In addition to the relative distances, the machine learning classifier may take inputs such as the size or dimension of the vehicle, the make and model of the vehicle, or the position of the signal transmitter into consideration to make more accurate predictions.

In a variety of embodiments, the computing device may use a machine learning classifier to determine the driver of the vehicle based on the ultrasonic sensing data and other types of sensor data from the sensor array. For example, the infrared sensor may determine the presence and relative positions of the occupants. The pressure sensor may determine the presence of the occupants and their relative body weights. The motion sensor may use the video camera software to determine the posture of the occupants and their relative positions in the vehicle. The sound sensor may determine the relative distances of the occupants to the sensor. The machine learning classifier may take some or all this information from various sensors as input and make more accurate predictions. The machine learning classifier may include supervised or unsupervised machine learning classifiers. The training of the machine learning classifier is discussed further in FIG. 4.

It should be readily apparent to one having ordinary skill in the art that a variety of machine learning classifier architectures can be utilized including (but not limited to) decision trees, k-nearest neighbors, support vector machines (SVM), neural networks (NN), recurrent neural networks (RNN), convolutional neural networks (CNN), probabilistic neural networks (PNN), transformer models, and the like. RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine learning classifiers can be utilized, more specific machine learning classifiers when available, and general machine learning classifiers at other times can further increase the accuracy of predictions.

Figure 4:
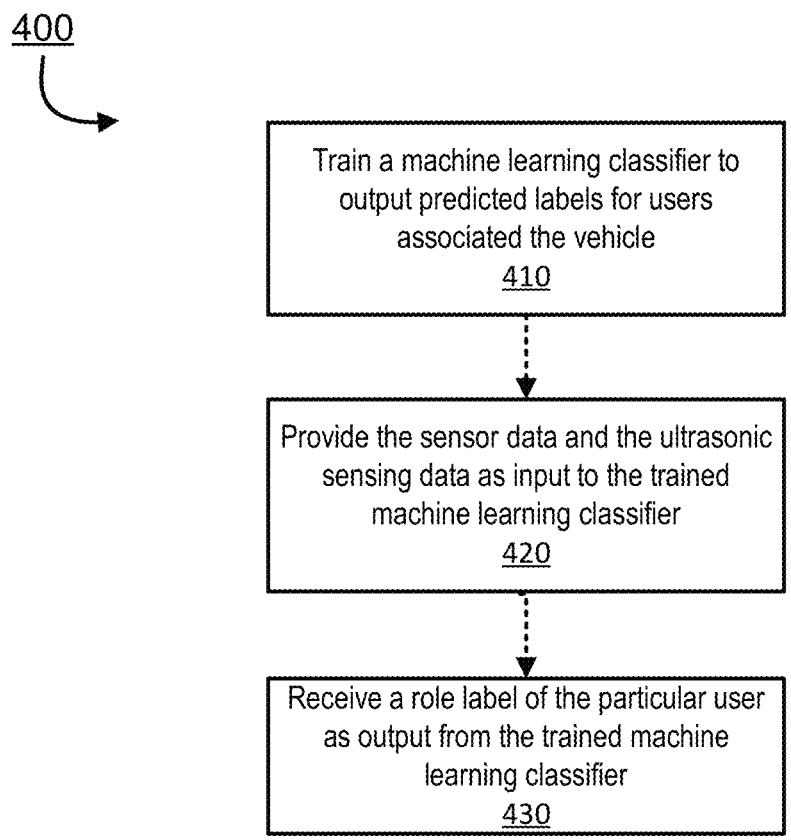
FIG. 4 depicts an illustrative method for training a machine learning classifier in accordance with one or more aspects of the disclosure.

FIG. 4 depicts an illustrative method for training a machine learning classifier in accordance with one or more aspects of the disclosure. Some or all of the steps of process 400 may be performed using one or more computing devices as described herein. In a variety of embodiments, some or all of the steps described below may be combined and/or divided into sub-steps as appropriate.

At step 410, the machine learning classifier may be trained using training data including predefined labels associated a set of occupants in various vehicles. The predefined labels may include a driver role or a passenger role. The training data may also include vehicle related data such as the year/model of the vehicle, the size or the dimension of the vehicle. The training data may include sensor related data such as the positions of the signal transmitter and sensor array, and the types of the sensors. A weight factor may be assigned to a specific type of sensor. For example, a relative greater weight may be assigned to the signal transmitter using ultrasonic signals, and a relative smaller weight may be assigned to a sound sensor. The training data may include occupants related data, such as the number of occupants in the vehicle, the number of mobile devices the occupants carry in the vehicle. The occupants and the mobile devices may have a one to one relationship, or one to many relationship.

In a variety of embodiments, the machine learning classifier may output predicted labels based on the training data. The machine learning classifier may determine a first set of predicted labels on the occupants based on the training data and their corresponding weight factors. Each predicted label may correspond to a confidence score that the machine learning classifier has correctly predicted the labels. If the corresponding confidence scores fall below a threshold value, for example, 95%, the machine learning classifier may regenerate the labels using adjusted weights and training data. After several rounds of iterations, the machine learning classifier may be trained until a confidence score reaches a threshold value, such as 95%. The machine learning classifier may identify an optimal set of weight factors corresponding to the confidence score.

At step 420, the trained machine learning classifier may take the sensor data and the ultrasonic sensing data for occupants in a vehicle as input. At step 430, the trained machine learning classifier may determine a role label of the particular occupant indicating whether the particular occupant is a driver of the vehicle based on the sensor data and the ultrasonic sensing data.

In a variety of embodiments, the ultrasonic sensing may be used to track the storage and movement of a cargo, particularly for high value or controlled products such as tobacco or alcohol. An ultrasonic sensor may be mounted on a cargo pallet, and a signal transmitter may be mounted on a gate of a warehouse. A ledger may be created when the cargo is moved out of the warehouse so that the information related to the chain of custody may be recorded in the ledger.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computer-implemented method comprising:
receiving, by a computing device and from a signal transmitter in a vehicle, ultrasonic sensing data associated with a plurality of mobile devices in the vehicle, wherein the plurality of mobile devices are associated with a plurality of occupants in the vehicle, and wherein the signal transmitter comprises a high-frequency ultrasonic transmitter;
determining, by the computing device, a unique identifier associated with each of the plurality of mobile devices;
determining, based on the ultrasonic sensing data and the unique identifier, a relative distance from the signal transmitter to each of the plurality of mobile devices in the vehicle;
determining that a particular occupant, from the plurality of occupants in the vehicle, is a driver in the vehicle by comparing the relative distance from the signal transmitter to each of the plurality of mobile devices; and
storing, in a sensing database, a frequency signature associated with a particular mobile device of the plurality of mobile devices, wherein the frequency signature indicates a mapping between an identifier of the particular mobile device and a particular frequency that the signal transmitter used to communicate with the particular mobile device.

2. The method of claim 1, further comprising:
receiving, by the computing device, sensor data from a sensor array associated with the vehicle; and
determining, using a machine learning classifier and based on the ultrasonic sensing data and the sensor data, that the particular occupant is the driver of the vehicle.

3. The method of claim 2, wherein the sensor array comprises an infrared sensor, a sound sensor, a pressure sensor and a motion sensor.

4. The method of claim 2, wherein the machine learning classifier comprise a supervised machine learning classifier and an unsupervised machine learning classifier.

5. The method of claim 2, wherein determining, using the machine learning classifier, that the particular occupant is the driver of the vehicle comprises:
prior to using the machine learning classifier, training, using training data comprising predefined labels associated with a set of occupants in the vehicle, the machine learning classifier to output predicted labels for occupants associated with the vehicle;
providing, as input to the trained machine learning classifier, the sensor data and the ultrasonic sensing data; and
receiving, as output from the trained machine learning classifier and based on the sensor data and the ultrasonic sensing data, a role label of the particular occupant indicating whether the particular occupant is the driver of the vehicle.

6. The method of claim 5, wherein training the machine learning classifier comprises:
generating, using the machine learning classifier, a first set of predicted labels;
determining that the first set of predicted labels have corresponding confidence scores falling below a threshold value; and
regenerating, using the machine learning classifier, a second set of predicted labels, wherein the second set of predicted labels having confidence scores above the threshold value.

7. The method of claim 1, further comprising:
receiving, from the signal transmitter, the ultrasonic sensing data associated with a plurality of frequencies, wherein each frequency corresponds to one of the plurality of the mobile devices in the vehicle.

8. The method of claim 7, wherein each frequency corresponds to a communication channel between the signal transmitter and the corresponding mobile device.

9. A computing device comprising:

one or more processors; and memory storing instructions that, when executed by the one or more processors, cause the computing device to:
- receive, from a signal transmitter in a vehicle, ultrasonic sensing data associated with a plurality of mobile devices in the vehicle, wherein the plurality of mobile devices are associated with a plurality of occupants in the vehicle, and wherein the signal transmitter comprises a high-frequency ultrasonic transmitter;
- determine a unique identifier associated with each of the plurality of mobile devices;
- determine, based on the ultrasonic sensing data and the unique identifier, a relative distance from the signal transmitter to each of the plurality of mobile devices in the vehicle;
- determine that a particular occupant, from the plurality of occupants in the vehicle, is a driver in the vehicle by comparing the relative distance from the signal transmitter to each of the plurality of mobile devices; and
- store, in a sensing database, a frequency signature associated with a particular mobile device of the plurality of mobile devices, wherein the frequency signature indicates a mapping between an identifier of the particular mobile device and a particular frequency that the signal transmitter used to communicate with the particular mobile device.

10. The computing device of claim 9, wherein the instructions, when executed by the one or more processors, cause the computing device to:
- receive sensor data from a sensor array associated with the vehicle; and
- determine, using a machine learning classifier and based on the ultrasonic sensing data and the sensor data, that the particular occupant is the driver of the vehicle.

11. The computing device of claim 10, wherein the sensor array comprises an infrared sensor, a sound sensor, a pressure sensor and a motion sensor.

12. The computing device of claim 10, wherein the machine learning classifier comprises a supervised machine learning classifier and an unsupervised machine learning classifier.

13. The computing device of claim 10, wherein the instructions, when executed by the one or more processors, cause the computing device to:
- prior to using the machine learning classifier, training, using training data comprising predefined labels associated with a set of occupants in the vehicle, the machine learning classifier to output predicted labels for occupants associated with the vehicle;
- provide, as input to the trained machine learning classifier, the sensor data and the ultrasonic sensing data; and
- receive, as output from the trained machine learning classifier and based on the sensor data and the ultrasonic sensing data, a role label of the particular occupant indicating whether the particular occupant is the driver of the vehicle.

14. The computing device of claim 10, wherein the instructions, when executed by the one or more processors, cause the computing device to:
- generate, using the machine learning classifier, a first set of predicted labels;
- determine that the first set of predicted labels have corresponding confidence scores falling below a threshold value; and
- regenerate, using the machine learning classifier, a second set of predicted labels, wherein the second set of predicted labels having confidence scores above the threshold value.

15. A non-transitory computer-readable medium storing instructions that, when executed, configure a computing device to:
- receive, from a signal transmitter in a vehicle, ultrasonic sensing data associated with a plurality of mobile devices in the vehicle, wherein the plurality of mobile devices are associated with a plurality of occupants in the vehicle, and wherein the signal transmitter comprises a high-frequency ultrasonic transmitter;
- determine a unique identifier associated with each of the plurality of mobile devices;
- determine, based on the ultrasonic sensing data and the unique identifier, a relative distance from the signal transmitter to each of the plurality of mobile devices in the vehicle;
- determine that a particular occupant, from the plurality of occupants in the vehicle, is a driver in the vehicle by comparing the relative distance from the signal transmitter to each of the plurality of mobile devices; and
- store, in a sensing database, a frequency signature associated with a particular mobile device of the plurality of mobile devices, wherein the frequency signature indicates a mapping between an identifier of the particular mobile device and a particular frequency that the signal transmitter used to communicate with the particular mobile device.

16. The non-transitory computer-readable medium of claim 15, wherein the instructions, when executed, configure the computing device to:
- receive sensor data from a sensor array associated with the vehicle; and
- determine, using a machine learning classifier and based on the ultrasonic sensing data and the sensor data, that the particular occupant is the driver of the vehicle.

17. The non-transitory computer-readable medium of claim 16, wherein the sensor array comprises an infrared sensor, a sound sensor, a pressure sensor and a motion sensor.

18. The non-transitory computer-readable medium of claim 16, wherein the instructions, when executed, configure the computing device to:
- prior to using the machine learning classifier, training, using training data comprising predefined labels associated with a set of occupants in the vehicle, the machine learning classifier to output predicted labels for occupants associated with the vehicle;
- provide, as input to the trained machine learning classifier, the sensor data and the ultrasonic sensing data; and
- receive, as output from the trained machine learning classifier and based on the sensor data and the ultrasonic sensing data, a role label of the particular occupant indicating whether the particular occupant is the driver of the vehicle.

* * * * *